3,559,377
PROCESS FOR SEPARATING CARBON BLACK FROM GASEOUS MIXTURES
Giovanni Perri, Giuseppe Tubiello, and Gaetano Palombella, Novara, Italy, assignors to Montecatini Edison S.p.A., Milan, Italy
No Drawing. Filed Apr. 22, 1965, Ser. No. 450,201
Claims priority, application Italy, Apr. 29, 1964,
9,289/64
Int. Cl. B01d 47/06
U.S. Cl. 55—85      2 Claims

---

A process for separating carbon black from gaseous mixtures by contacting the gaseous mixture with an emulsion of oily hydrocarbon and water at a temperature below the dew point of water. The aqueous suspension of oil and carbon black is settled and additional oil is added to the carbon black and oil floating layer to make it fluid and pumpable.

---

Our invention relates to a process for separating carbon black from gaseous mixtures, particularly from those gaseous mixtures obtained by pyrolysis or by partial combustion of hydrocarbons.

It is known that in the incomplete combustion of hydrocarbons small amounts of free carbon, in the form of carbon black and tarry substances, are obtained together with the main products such as acetylene, olefins, hydrogen and carbon monoxide. The presence of carbon black and tarry substances, when the incomplete combustion is not for the purpose of producing carbon black, represents an inconvenience for the further processing of the gas and must, therefore, be removed from the cycle.

For this purpose, the cracking gases are washed with heavy hydrocarbons (gas oils, petroleum naphtha) or with water. By washing the gases with heavy hydrocarbons, oily carbon black suspensions are obtained, which are further treated in order to recover carbon black or the oils. The washing of the gases with oil only is almost always expensive. A double washing is, therefore, generally adopted; first with water to remove most of carbon black and then with oil to eliminate the rest of carbon black.

For instance, in some plants for the production of acetylene and/or olefins from methane or gasoline, the gas leaving the combustion furnaces is cooled to about 100–130° C. by quenching with water. In this stage, in which 1 to 20 liters of water per normal cubic meter (Nm.$^3$) of gas are used, most of carbon black is separated. Further washings with water are then carried out at temperatures from 70 to 130° C. under pressures from 1 to 4 atm., in injection apparatuses, e.g. of the Venturi type, with water amounts of the order of 1 liter per Nm.$^3$ of gas. By these washings with water, aqueous suspensions containing 0.15 to 5 g./l. of carbon black are obtained. The remaining traces of carbon black (about 0.2 g./Nm.$^3$ of gas) are removed by washing the gases with gas oil or petroleum naphtha. In general, the carbon black thus removed is utilized as a fuel, since its use as carbon black would require expensive purifications. As much water as possible is therefore removed. Carbon black is separated from the aqueous suspension by decantation and filtration or by agglomeration with liquid hydrocarbons (pentane, benzene, naphtha, gas oils, etc.).

In the case of filtration or of another mechanical separation, a still highly hydrated carbon black (7–8 parts of water per part of carbon black) is obtained. In the agglomeration, the aqueous suspensions obtained by washing with water, after addition of the said hydrocarbons, are subjected to a vigorous agitation; by operating in this way, the carbon black is agglomerated in the form of solid prills and can be easily separated from water (British Pats. 734,475 and 741,135, Italian Pats. 594,518; 594,519; 638,757). This process, too, shows some inconveniences. Beside a supplementary plant for the specific treatment, considerable power is required for agitation, corresponding to at least 2.25 kw./m.$^3$ of suspension (Italian Pat. 638,757).

Both methods, moreover, must be applied to the whole suspension leaving the washing stage; this is expensive since the carbon black suspensions are very dilute, e.g. concentrations of the order of 0.15 g. of carbon black per liter. In these cases, in order to agglomerate the carbon black, it will be necessary to consume for the agitation only a minimum of 2.25 kwh. per 6 m.$^3$ of suspension (assuming an average agitation time of 10 minutes). This represents a power consumption of about 2 kw. per kg. of dry carbon black, which is a large percentage of the thermal energy that can be recovered from the same carbon black.

We have found surprisingly that the above inconveniences can be avoided if the first washing is caried out with an aqueous emulsion of water-immiscible hydrocarbons instead of with water alone. By operating in this way, the flocculation of the carbon black particles is obtained in the gas phase, due to the absorption of hydrocarbons on carbon black. These heavy hydrophobic flocks come quickly to the surface of water, at the outlet of the washing apparatus; the water can, therefore, be recycled immediately without being subjected to other treatments since it is clear.

The separation rates of carbon black from water obtained with our method are very high, in the order of 50 m./h., and cannot be obtained with the usual flocculating agents used in these cases. Another advantage of our invention is that it is possible to obtain, in a simple and economic way, fluid suspensions of carbon black in gas oil, directly at the outlet of the washing apparatuses, namely without the necessity of expensive intermediate operations of pelletizing and re-suspension of the pellets in fuel oil.

By further addition of fuel oil to the surface of carbon black containing water and by a very slight agitation of this oily surface layer, a fluid layer of carbon black in oil containing only little water is obtained. This can be easily decanted from the lower water layer and directly pumped to the burners for the combustion.

Another advantage is that the removal of carbon black is quantitatively improved, thus making it possible to reduce the successive final washing of the gases with hydrocarbons. The oily hydrocarbons to be emulsified with water, according to the present invention, must be liquid under the temperature and pressure conditions used in the washing stage.

The most suitable hydrocarbons are those coming from the distillation of petroleum and having a boiling point from 100 to 350° C., such as, e.g., heavy gasolines (white spirit) (boiling point 100–180° C., density 0.78), kerosene (boiling point 150–300° C., density 0.75–0.87), gas oil (boiling point 300–350° C., density 0.83–0.9). The fractions obtained by distillation of tar and containing cyclic hydrocarbons, such as light oils (density 0.95) can also be used provided that their boiling points are within the above range. The selection of any of the said products depends on its cost and availability; oils having a boiling point from 250° to 350° C. are preferred.

The amounts of hydrocarbon to be emulsified with water vary from a minimum of 0.2 part to 10 parts by weight per part of carbon black present in the cracking gases. The minor amounts from 0.2 to 1 part, preferably from 0.5 to 1, are used when only the quick separation of carbon black on the water surface, as explained above, is desired. The higher amounts, from 8 to 10 parts, are used when, in addition to this separation, it is desirable to obtain directly on the water surface an oily carbon layer, already sufficiently fluid to be decanted and pumped to the burners. This last possibility, however, as said above, can also be obtained in two stages, by first emulsifying a small hydrocarbon amount with the washing water and then adding to the surface of the decanter, where carbon black is collected, the sufficient further amount of hydrocarbon to obtain the fluid layer.

The use of one system instead of the other depends only on the particular conditions of cracking and on the type of plant used but always leads to the same results in a simple way.

For instance, in some plants, in order to obtain a higher effectiveness of removal, the washing of the gases with water is carried out in several phases, with recycle of the washing waters. In these cases it can be preferable to use limited amounts of hydrocarbons in emulsion in order to avoid the contamination of the apparatus walls with the hydrocarbon which could be already disemulsified during the washings. In this case therefore the remaining amount of hydrocarbon required for obtaining the oily carbon black layer will be added successively, as specified above.

The water amount used for the washing varies from 1 to 20 liters per 1 $Nm.^3$ of gas, preferably from 1 to 3 liters. The concentration of oil in water varies from 0.1% to 30% with the lower values, as stated above, for the separation of the carbon black layer on the water surface, while the higher values are for the formation of the oily layer which can be pumped.

During the washing, the gas must be cooled below the dew point so as to have the liquid water to scrub carbon black.

For the application of the process of the present invention no other particular precautions, in addition to those specified above, are required. More particularly, no modification in the washing cycles, as usually carried out for the present in the various cracking processes, is necessary. The only change is to provide a system for emulsifying the liquid hydrocarbon in the washing water. This can be obtained, according to the prior art, either by a strong mechanical agitation or by the use of chemical emulsifiers of the oil/water type.

A good emulsion is obtained, for example, by dissolving 1% by weight of Tween 65 (of Atlas Powder, USA) in the hydrocarbon; other suitable emulsifiers are: Ethomeen 18/15 of Armour (USA) and Noramox of Prochinor (France).

A stability time of only a few minutes is sufficient for these emulsions. This is the average standing time of the emulsion in the apparatus before the washing of the gas. In the continuous plants, the hydrocarbon can be injected in the suction line of a centrifugal pump, which conveys the washing water.

After washing with the emulsion, the last traces of carbon black must be removed from the gas; as in the washing with water, this final purification is carried out with socket filters or by washing with mineral oil. In the latter case, the mineral oil, after the final washing, can then be used for preparing the oil/water emulsion for the first washing.

The following examples which illustrate the invention without limiting its scope, clearly show the advantages obtained by operating with the process according to the present invention.

EXAMPLE 1

This example describes a test according to the prior art. A cracking gas obtained by partial combusion of methane under atmospheric pressure and having the following volumetric composition:

$C_2H_2$—8:5%
CO—28.5%
$H_2$—50%
$CO_2$—3.5%
Carbon black—4.5 g./$Nm.^3$ of gas was subjected to washing with water.

The gas was washed at 80° C., with about 20 liters water per $Nm.^3$ of cracking gas, in a rain tower provided with water sprayers in the upper portion. The gases introduced through the bottom of the column were countercurrently washed. The washed gas still contained 1.5 g. of carbon black per $Nm.^3$ of gas.

An aqueous suspension containing 0.15 g./l. of carbon black was obtained, which at the temperature of 70° C. had a clarification rate (or rate of sedimentation of carbon black) of 0.06 m./h. In order that the clear water of this suspension can be recycled to the washing step, in a plant for 4000 $Nm.^3$/h. of $CH_4$, a decantation surface of at least 2660 $m.^2$, equivalent to a decanter having a diameter of 58.2 m. is necessary.

By sedimentation of the carbon black of this suspension, a concentrate consisting of 97 parts of water and 3 parts of carbon black was obtained.

EXAMPLE 2

The same gas of Example 1 was washed with an emulsion of 0.1 part by weight of gas oil in 1000 parts of water. The emulsion was obtained by mechanical agitation, but good results were also obtained in continuous tests, by injecting gas oil through a sprayer into the pipe carrying water to the washing apparatus. After homogenization, the emulsion remained sufficiently stable for 5 minutes.

By washing the gases with this emulsion, with a ratio of 20 l./$Nm.^3$, an aqueous suspension was obtained containing 0.3 g./l. of oily carbon black flocks which, at 70° C., come to the water surface with an average rate of 50 m./h., leaving clear the lower water layer. The washed gas contained about 0.5 g. of carbon black per $Nm.^3$ of gas.

Under these conditions, for the continuous recycle of the clear water to the washing, in a plant treating 4000 $Nm.^3$ of $CH_4$, a decantation surface of at least 3.2 $m.^2$, corresponding to a decanter having a diameter of 2.02 m., is sufficient. The concentrated carbon black layer, separated from the water surface, consists of, by weight, 10 parts of carbon black, 5 parts of gas oil and 85 parts of water. The gas oil used in this test had a distillation range from 275° to 310° C. at 760 mm. Hg and a density at 20° C. of 0.83.

EXAMPLE 3

The carbon black obtained in Examples 1 and 2 is added to gas oil (having the same characteristics as that of Example 2) to obtain an oily suspension of carbon black to be sent to the burners of the steam production plant.

In the two cases, we obtained:

(a) The concentrate of Example 1, consisting of 97 parts of water and 3 parts of carbon black, required a gas oil amount corresponding to 12 times the carbon black weight, in order to obtain a suspension which is fluid at 50° C. To obtain the oily suspension, we kept the carbon black concentrate and the gas oil under slight agitation for 20 minutes at the temperature of 50° C., then removed the water which separated out on the bottom of the mixer. The oily layer obtained had the following composition by weight:

| | Percent |
|---|---|
| Carbon black | 3.8 |
| Gas oil | 46.2 |
| Water | 50 |

(b) The carbon black layer separated at the surface of water in Example 2 consisting of by weight 10 parts of carbon black, 5 parts of gas oil and 85 parts of water, required a total gas oil amount corresponding to about 7 times the weight of carbon black in order to obtain an oily suspension fluid at 50° C. This suspension was obtained by operating as in (a).

The composition by weight of this suspension was:

| | Percent |
|---|---|
| Carbon black | 10.5 |
| Gas oil | 73.7 |
| Water | 15.8 |

When using the same gas oil/carbon black ratio of paragraph (a), namely 12 parts by weight of gas oil per part of carbon black, an oily layer having the following composition by weight was obtained:

| | Percent |
|---|---|
| Carbon black | 6.9 |
| Gas oil | 82.7 |
| Water | 10.4 |

EXAMPLE 4

A cracking gas, obtained by incomplete combustion of $CH_4$ under an absolute pressure of 4 atm. and having the following volumetric composition:

$C_2H_2$—7.66%
$H_2$—54.00%
$CO$—26.5%
$CO_2$—3.5%
$CH_4$—5%
Carbon black—10 g./Nm.³ of gas was washed at the temperature of 130° C. with water or with an aqueous kerosene emulsion.

In the two cases we obtained—

(a) Washing with water alone:

Total washing water—3 liters/Nm.³ of gas
Washing temperature—130° C.
Washing pressure—4 atm.
Average carbon black concentration in water—3.15 g./liter
Residual carbon black in the washed gases—0.55 g./Nm.³

The suspension of carbon black obtained had a clarification rate of 0.075 m./h. at 70° C.

(b) Washing with an emulsion of 25 g. of kerosene per liter of water, obtained by means of a strong mechanical agitation:

Washing emulsion—3 liters/Nm.³ of gas
Washing temperature—130° C.
Washing pressure—4 atm.
Average concentration of black carbon in water (exclusive of kerosene)—3.3 g./l.
Residual carbon black in the washed gases—0.1 g./Nm.³

The oily carbon black in water came to the surface with a rate of 45 m./h. at 70° C., forming a fluid oily layer having an $H_2O$ content of 20%, which could be easily decanted. The kerosene used had a distillation range from 200° C. to 275° C. under 750 mm. Hg and a density at 25° C. of 0.82.

EXAMPLE 5

A gas obtained by cracking of gasoline for the production of acetylene and ethylene, and having the following volumetric composition, is subjected to washing:

| | Percent |
|---|---|
| $C_2H_2$ | 9.77 |
| $C_2H_4$ | 9.54 |
| $H_2$ | 33.5 |
| CO | 28 |
| $CO_2$ | 7.4 |

It contains 3g./Nm.³ of carbonaceous substances in the form of tars (8%) and carbon black (92%).

The gas is washed with water or with an emulsion of gas oil in water.

In the two cases we obtained—

(a) Washing with water alone:

Washing water—2 liters/Nm.³ of gas
Washing temperature—130° C.
Washing pressure—4 atm.
Average concentration of the carbon substances in water— 0.5 g./liter The aqueous suspension of carbon substances at 70° C. had a clarification rate of 0.03 m./h.

(b) Washing with an emulsion of 0.3 g. of gas oil in 1000 g. of water:

Washing emulsion—2 liters/Nm.³
Washing temperature—130° C.
Washing pressure—4 atm.
Average concentration of the carbonaceous substances in water (exclusive of gas oil)—0.75 g./liter The suspension obtained by washing had a clarification rate at 70° C. of 70 m./h. The gas oil used had a distillation range from 310° C. to 350° C. at 760 mm. Hg and a density at 25° C. of 0.85.

We claim:

1. A process for separating carbon black from gaseous mixtures, which comprises emulsifying an oily hydrocarbon, immiscible with water and boiling from 100° to 350° C., with water to form an oil-in-water emulsion, the hydrocarbon amount added to the water to form the oil-in-water emulsion being between 0.5 to 1 part by weight of hydrocarbon per part of carbon black present in the gas in order to obtain the quick floating of the carbon black and oil layer on the water surface, washing the gases with the emulsion thus obtained at a temperature below the dew point of water and settling the aqueous suspension of oil and carbon black, obtained by washing, to obtain a lower layer of clear water and an upper layer containing carbon black and oil, and wherein additional oil is added to the carbon black and oil floating layer in order to make it fluid and pumpable.

2. A process for separating carbon black from gaseous mixtures, which comprises emulsifying an oily hydrocarbon, immiscible with water and boiling from 100° to 350° C., with water to form an oil-in-water emulsion, the hydrocarbon amount added to the water to form the oil-in-water emulsion being from 8 to 10 parts of hydrocarbon per part of carbon black present in the gas, washing the gases with the emulsion thus obtained at a temperature below the dew point of water and settling the aqueous suspension of oil and carbon black, obtained by washing, to obtain a lower layer of clear water and to obtain a fluid oily layer of carbon black on the water surface.

References Cited

UNITED STATES PATENTS

| | | | |
|---|---|---|---|
| 2,207,774 | 7/1940 | Barthelemy | 55—85 |
| 2,903,423 | 9/1959 | Mondria et al | 23—209.9 |
| 2,980,523 | 4/1961 | Dille et al. | 55—85X |
| 3,016,986 | 1/1962 | Dille et al. | 55—85 |
| 3,022,148 | 2/1962 | James | 23—209.9X |

FOREIGN PATENTS

| | | | |
|---|---|---|---|
| 834,989 | 5/1960 | Great Britain | 55—85 |

JOHN ADEE, Primary Examiner

U.S. Cl. X.R.

55—89